(No Model.)
T. W. BRYANT.
SKATE BLADE AND ART OF MANUFACTURING SAME.
No. 524,129. Patented Aug. 7, 1894.
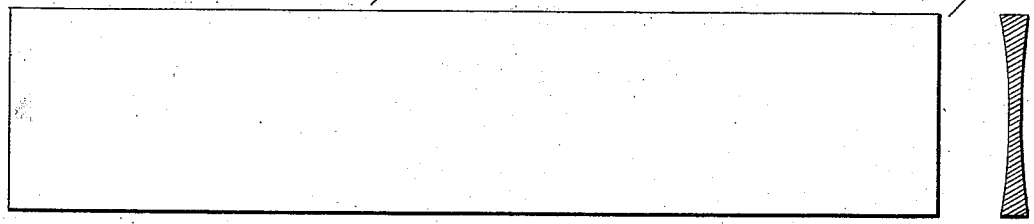
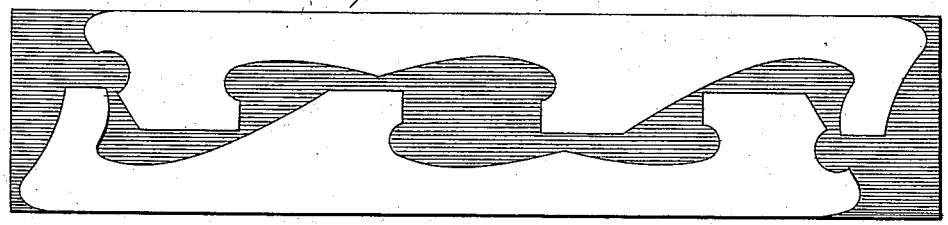
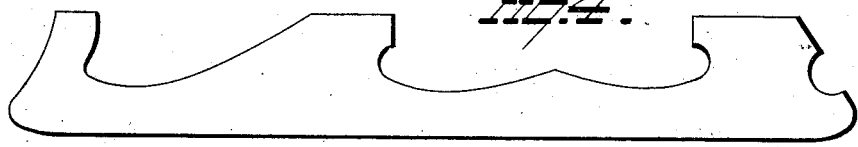
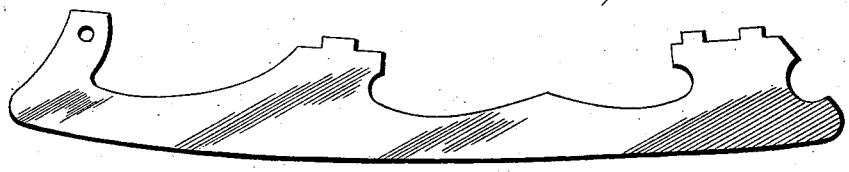
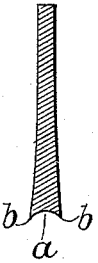
Witnesses
E. J. Nottingham
G. F. Downing
Inventor
Thomas W. Bryant
By H. A. Seymour
Attorney

UNITED STATES PATENT OFFICE.

THOMAS W. BRYANT, OF TORRINGTON, CONNECTICUT.

SKATE-BLADE AND ART OF MANUFACTURING SAME.

SPECIFICATION forming part of Letters Patent No. 524,129, dated August 7, 1894.

Application filed March 24, 1894. Serial No. 504,934. (No model.)

*To all whom it may concern:*

Be it known that I, THOMAS W. BRYANT, of Torrington, in the county of Litchfield and State of Connecticut, have invented certain new and useful Improvements in Skate-Blades and the Art of Manufacturing the Same; and I do hereby declare the following to be a full, clear, and exact description of the invention, such as will enable others skilled in the art to which it appertains to make and use the same.

My invention relates to an improvement in skate blades and the art of manufacturing the same.

Heretofore in the manufacture of blades for ice-skates, a plate was rolled while hot into the desired shape and thickness. Hot-rolling the plate produced a scale on its surface which was removed by pickling, when the blade-blank was punched from the plate, its opposite sides ground and afterward polished, and its tread ground into slightly concave form to produce sharp cutting side edges. This was an expensive method of making the blades owing to the time and labor required in the operations of grinding and polishing necessary to impart the desired finished and polished concave surface to the opposite sides of the blade. Skate-blades as thus made, lacked uniformity in finish, and their treads were comparatively soft and required frequent grinding and sharpening to render them fit for use. The operations of grinding and polishing resulted in drawing what temper there was in the blade, and hence the tread was rendered comparatively soft. As the result of this mode of manufacture it has been found well nigh impossible to preserve the sharpness of the blades, unless the latter were subsequently subjected to tempering, but this adds so materially to the expense as to be out of the question in respect to the cheaper grades of skates.

The object of my invention is to provide a skate blade whose stock is exceedingly dense and well tempered; having a smooth and highly finished surface, and a self-sharpening tread, and a further object is to provide a process by which these improved skate-blades may be produced at a cost less than that attendant on the manufacture of skate blades by the old process, and with these ends in view my invention consists, first, in a skate blade having an exceedingly hard and polished outer skin of metal on its opposite sides, and which serve as cutting edges for the softer intervening metal of the tread; second, the method of manufacturing skate-blades, which consists in cold-rolling a metal plate and forming thereon an exceedingly hard and smooth outer skin; then cutting or punching the blank from the plate, and then finishing the blade and producing a tread having hard and sharp outer edges and a softer intervening portion; third, in certain other features of improvement in the method of manufacturing skate-blades as will be hereinafter described and pointed out in the claims.

In the accompanying drawings, Figure 1 is a plan view of a plate from which the blanks are to be cut or punched. Fig. 2 is a cross-section of the plate. Fig. 3 illustrates the blanks as punched from the plate. Fig. 4 is a plan view of one of the blanks. Fig. 5, is a cross-section of the blank. Fig. 6 is a plan view of the blank after it has been bent into the desired shape, and Fig. 7 is a cross section of the completed blade after its tread has been ground and sharpened.

I first take a piece of steel and roll it down while cold so that its cross-section is of the shape shown in Fig. 2, or it may be rolled into any other desired shape. The cold-rolling is continued until the metal has been rendered dense and firm, and its surface rendered perfectly smooth and highly finished. The operation of cold rolling to the extent indicated, results in the formation of a very thin and exceedingly hard skin of metal enveloping the plate. The blanks are then punched from the plate in the manner indicated in Fig. 3, which results in the production of blanks of the form shown in plan view in Fig. 4, and in cross section as represented in Fig. 5. Owing to the fact that the metal is condensed and hardened and is provided with a thin hard skin enveloping the plate. No burr is formed on the blank in punching it from the plate, as is the case when the blank is punched from hot rolled plates, the metal being so soft that the cutting dies operate to crowd or force the metal inwardly on the lower side of the blank, and outwardly in the form of a burr on its upper side. The blank is then bent into the form illustrated in Fig. 6 by which a rocker bearing is imparted to the tread. The tread is then ground so as to give it a concave bearing surface $a$ as illustrated in Fig. 7. In grinding the tread, any skin which may have been formed thereon in cold-rolling, is removed, thereby leaving the outer edges of the tread provided with very thin and sharp cutting edges $b$, $b$, formed by the hard cold rolled skin on the opposite sides of the blade, while the metal of the tread between its cutting edges is comparatively soft and hence the tread is self-sharpening, its central portion wearing away much more rapidly than its thin sharp cutting edges.

By my improved method the cost of manufacturing skate-blades, is largely reduced because I obviate the slow and costly process of grinding and polishing the sides of the blade. Again I am enabled to produce a stronger and lighter blade, because the process of cold-rolling renders the metal exceedingly dense and tough, and much stronger, than that resulting from reducing the plate to the desired form by grinding and polishing. The plate from which the blank is punched, may be cold-rolled so that its sides shall have any desired concavity and thus produce a blade having a comparatively wide tread and thin body-portion, while by the old process the sides were rendered but slightly concave in order not to sacrifice the strength of the blades. The blade formed by my process of cold-rolling has imparted to it a superior temper which results in preserving its cutting edges sharp and hard, while by the old process of grinding and polishing, the temper of the metal is drawn, leaving it comparatively soft so that the cutting edges of its tread required frequent grinding to keep them sharp and fit for use.

It is evident that the plate may first be hot-rolled into approximately the desired shape in cross section and afterward cold-rolled sufficiently to impart to it the desired density and finish also that at any stage in the process of cold-rolling, the plate may be annealed so that it shall not become too hard or highly tempered to seriously interfere with the manipulation of the metal; also that the blade may be constructed of any desired shape and size, and hence I do not restrict my invention to the particular steps in the process described nor to the particular shape or construction of skate blade shown and described, but, Having fully described my invention, what I claim as new, and desire to secure by Letters Patent, is—

1. A skate blade having a cold-rolled polished outer skin of metal, which is exceedingly thin, formed on its opposite sides, which serve as cutting edges for the intervening metal of the tread, substantially as set forth.

2. The method of manufacturing skate blades, which consists in cold rolling a metal plate, thereby forming thereon an exceedingly hard and smooth outer skin, then cutting or punching the blank from the plate, and finally finishing the tread by grinding, substantially as specified.

In testimony whereof I have signed this specification in the presence of two subscribing witnesses.

THOMAS W. BRYANT.

Witnesses:
ISAAC W. BROOKS,
JOHN N. BROOKS.